INVENTORS
JOHN B. LLOYD
ROBERT W. WOLFE
ATTORNEY

INVENTORS
JOHN B. LLOYD
ROBERT W. WOLFE

ATTORNEY

United States Patent Office 3,061,876
Patented Nov. 6, 1962

3,061,876
METHOD AND APPARATUS FOR PRODUCING THERMOPLASTIC TUBING
John B. Lloyd, Terre Haute, Ind., and Robert W. Wolfe, Ringoes, N.J., assignors to Union Carbide Corporation, a corporation of New York
Filed Sept. 14, 1959, Ser. No. 839,824
8 Claims. (Cl. 18—14)

This invention relates to improvements in the blown-tube method and the apparatus for the production of self-sustaining plastic film in the form of thin-walled tubing. More particularly, it relates to a method and apparatus for extruding continuous thin-walled seamless tubing from thermoplastic organic materials.

The preparation of plastic film by the blown-tube method is well known. Thus U.S. Patents Nos. 2,461,975; 2,461,976 and 2,632,206 disclose extrusion apparatus and processes wherein a thermoplastic material in a formative plastic state is extruded through an annular die to form seamless tubing, and is withdrawn from the die by a pair of squeeze rolls spaced from the point of extrusion. As the tubing advances to the squeeze rolls and while it is in the formative plastic state it is inflated to a predetermined diameter by a gaseous medium introduced into the interior of the tubing.

A cooling gaseous medium is blown onto the exterior peripheral surface of the tubing in the vicinity of the point of extrusion to chill the tubing to an extent that when the tubing has been inflated to predetermined diameter, it will be in a set condition. The tubing in the set condition is then flattened upon passage through the squeeze rolls.

The term "formative plastic state" is used herein to define that state of the plastic wherein it is in the unset or partly set condition and can be enlarged, as by stretching by the amount of gaseous medium introduced into the interior of the tubing. Conversely, the term "set condition" is used herein to define that state of the plastic wherein it cannot be further enlarged by the amount of gaseous medium introduced into the tubing.

Though the previously described method and apparatus constitute a substantial advance in the art and have achieved wide commercial success, the rate of production of thermoplastic tubular film is limited by the rate of which the product can be cooled and handled as flattened tubing. This is evidenced by the fact that when an attempt is made to speed up and obtain more economical production rates in the extruding of the tubular film, certain difficulties arise.

One of these difficulties is concerned with the point at which the thermoplastic material of the tubing tends to solidify, that is, to change generally from an amorphous state to a crystalline state, and which at higher extrusion rates occurs at a greater distance from the die. This solidification point, commonly called the "frost line" is normally desired at the lower portion of the inflated tubing or bubble adjacent the die, such as less than about one and one-half final tube diameters removed therefrom. If the "frost line" is permitted to move to a position remote from the die, a second bubble may commence to form immediately above the die and this will propagate itself when it passes through the squeeze rolls. If a second bubble is thus formed, it may by pulsation of the gas within the bubble cause a third bubble to form and so on, creating in effect, a string of sausage-like bubbles in the tubing.

Another difficulty caused by increasing the extrusion rate of tubular thermoplastic film is that desired cooling in the formative plastic state must be uniformly applied to the periphery of the film bubble. If even the smallest degree of greater cooling effect is applied to the film surface at one point only, the film will thereby solidify more quickly at that point and will not inflate further. The tubular film will, however, continue to inflate at other points where cooling is not so effected, and thus the film will be thicker where the extra cooling has been applied and will also be in greater tension due to uniform pulling by the withdrawal effect of the squeeze rolls, such that creases or wrinkles will thereby occur in the product.

Still another difficulty caused by increasing the extrusion rate of tubular plastic film is that the inner peripheral surface of the tubing will not be sufficiently cooled by the time it has been advanced from the die to the squeeze rolls. As a consequence when the squeeze rolls flatten the tubing, portions of the inner surface contacting other portions thereof will tend to stick. Such occurrence is commonly called blocking which is measured by the resistance to separation by a separating force applied perpendicularly to the film as by a single lifting action. In addition if the outer peripheral surfaces of the tubing is not sufficiently cooled by the time it reaches the squeeze rolls it will tend to stick thereto and production will thereby become impossible.

An object of this invention is to provide a new and improved extrusion method for producing self-sustaining tubular plastic film and apparatus therefor.

Another object of this invention is to increase the rate of production of self-sustaining plastic film produced by the tube extrusion method.

Another object of this invention is to prevent blocking of the tubing as it is flattened by the flattening means and sticking of the film to the flattening means.

Other and additional objects will become apparent hereinafter.

According to the present invention the objects of this invention are accomplished by wholly enveloping the tubing from the vicinity of the die to the point of flattening, within a cooling medium of chilled circulating gas. The quantity, temperature, and the direction of flow, of the chilled gas are such as to cause the tubing to solidify in close proximity of the die and to reach its set condition when the tubing has been inflated to its predetermined diameter.

Further, to obtain increased rates of production without adversely affecting the uniformity of the film wall thickness, it is desirable to envelop the tubing from the vicinity of the die to a position in advance of the solidification point within a cooling medium of chilled gas; the velocity, temperature and quantity of the gas being uniform about the periphery of the tubing. The direction, velocity and temperature of the flow of the chilled gas impinging on the tubing are of such uniformity about the tubing as to prevent non-uniform distention of the tubing by the interior inflating gaseous medium.

Further, to obtain increased rates of production without the hereinbefore discussed detrimental effects at the flattening means, such as squeeze rolls, it is desirable to envelop them and the tubing adjacent thereto within a cooling medium of chilled circulating gas. The quantity, temperature and the direction of the flow of the chilled gas are such that the squeeze rolls are sufficiently cooled to prevent the tubing from sticking thereto, and the inner peripheral surface of the tubing about to be flattened is sufficiently cooled to prevent blocking when it is flattened by the rolls.

In general, any gaseous medium which does not deleteriously affect the plastic may be used as the cooling medium. Air because it is so cheap, is preferred.

The nature of the invention and the manner in which it may be practiced will become clear from the detailed description when taken in conjunction with the accompanying drawings forming a part of this specification, and wherein, FIG. 1 is a side elevation, partly in section, of one form of the tubular film extruding apparatus;

Figure 3:
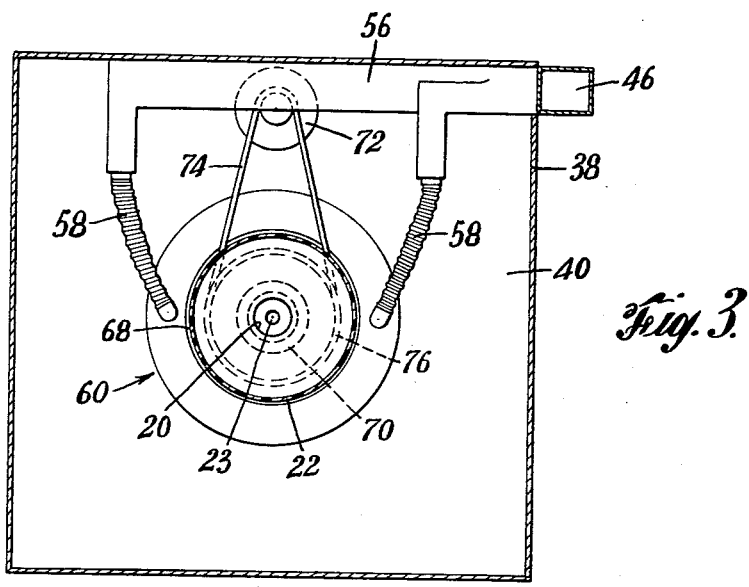
FIG. 3 is a section taken along line 3—3 of FIG. 1.

Referring now to the drawings, wherein like reference numerals designate like parts except as otherwise indicated the reference numeral 10 designates a conventional extruder, such as one made by National Rubber Company. The selected thermoplastic, such as polyethylene, is fed into the feed hopper 12, located at one end of the extruder. The thermoplastic is then fed through the extruder and heated therein until it reaches its formative plastic state, and in such condition, fed into a 90° elbow 14 appropriately secured, as by bolting to the head end 16 of the extruder 10. A die, generally designated by the reference numeral 18 is provided with an annular orifice 20, as shown in FIG. 3, from which the molten mass emerges as hot, viscous thermoplastic tubing 22. The die 18 is provided with an orifice 23, as shown in FIG. 3, which is connected to a gas supply not shown, whereby gas is introduced interiorly of the tubing to inflate the same. The gas supply is provided with a valve, not shown, so that when the desired quantity of the gas has been introduced within the tubing, further supply thereof can be prevented. In the event the quantity of gas within the tubing decreases, as for example, by leakage or otherwise, the requisite amount of gas can be added by proper manipulation of the valve.

In general, any gaseous medium which does not deleteriously affect the plastic may be used as the inflating medium. Air, because it is so cheap is preferred.

The inflated tubing 22 is withdrawn upwardly from the die orifice 20 in a substantially vertical direction by flattening means, such as a pair of counter rotatable squeeze rolls 24 and 26 disposed in spaced relationship above the die 18. The squeeze rolls are rotatably mounted with the peripheral speed of the rolls 24 and 26 being preferably such as will stretch the tubing while it is in the formative plastic state.

The rolls 24 and 26 also serve to collapse the tubing passing therebetween into a flattened, ribbon-like material 28 which is wound up on a wind-up reel by a torque motor, not shown.

Assisting the rolls 24 and 26 in flattening the tubing 22 are converging guide means intermediate the die 18 and the rolls 24 and 26. The guide means comprise two opposed sets of fixed slats 30 which contact the tubing 22 after it has been inflated to its predetermined final diameter and which are arranged in an inverted V-shape to form a converging path to the nip point 36 of the rolls 24 and 26. Accordingly, the slats 30 progressively shape the tubing from a circular shape to a slot shape having parallel sides with arc shaped ends by the time it reaches the nip 36 of the rolls 24 and 26.

It is to be noted that the inflating medium is entrapped or confined between the nip 36 of the rolls 24 and 26 and the die 18, and constitutes an isolated gaseous bubble which remains substantially stationary while the tubing advances thereupon from the die 18 through the successive slats 30 of the guide to the nip 36.

Figure 1:
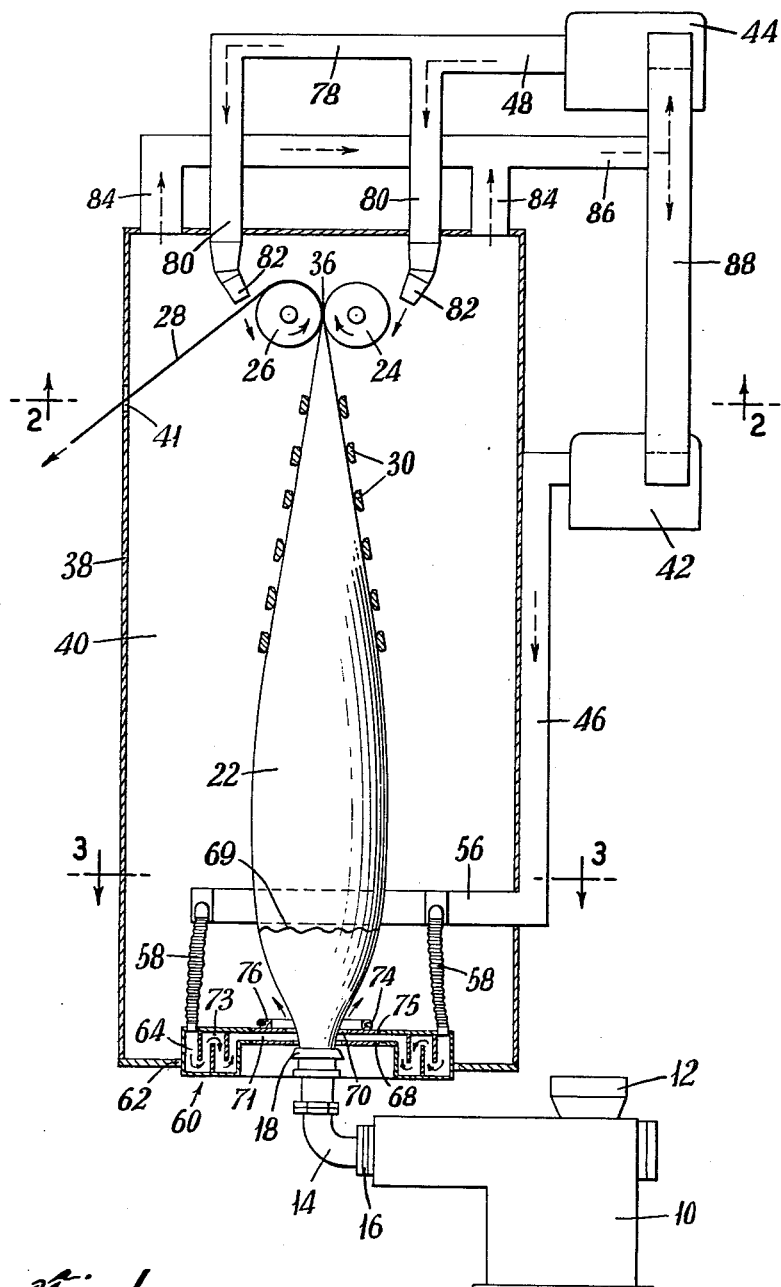
Figure 2:
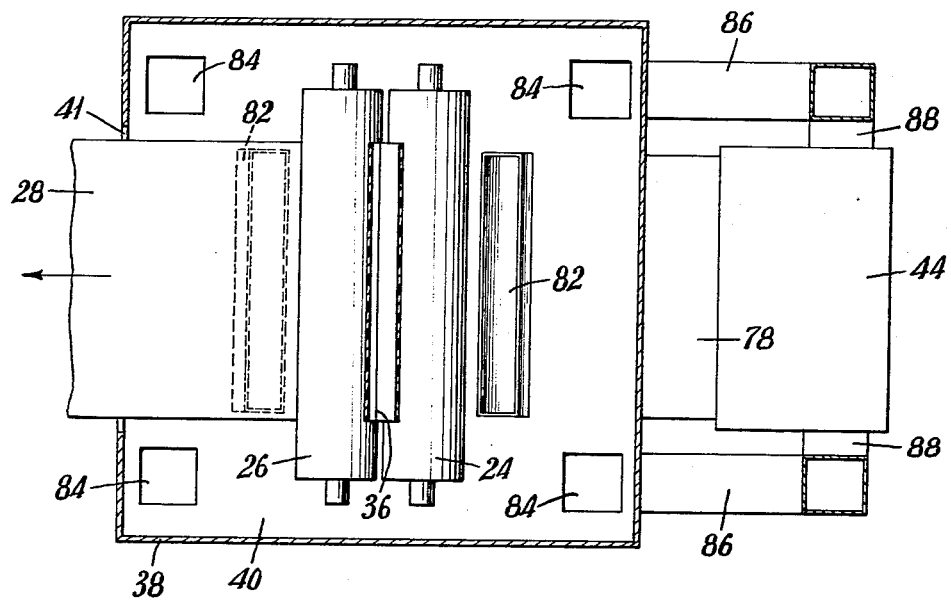
FIG. 2 is a section taken along line 2—2 of FIG. 1.

A housing 38 of structural sheet material encloses within a confined area or chamber 40 the rolls 24 and 26, guide slats 30 and the tubing 22 from the point of extrusion to a point beyond the rolls 24 and 26 through which chilled air is circulated as hereinafter described. Extending through a side wall of the housing 38 is a slot 41, as shown in FIG. 1 and FIG. 2 through which the flattened tubular material 28 is drawn by a wind-up reel, not shown, with such material 28 being cooled by the chilled circulating gas within the cooling chamber 40 after it leaves the rolls 24 and 26. The housing 38, also serves to insulate the tubing 22 from the heat of the extruder 10, the housing preferably being made of thermal insulating material, such as hard-surfaced Masonite or laminated Styrofoam.

Referring now to the embodiments of the invention, the embodiment shown in FIGS. 1–3 provide a pair of inter-connected cooling means 42 and 44 each located externally of the housing 40 and respectively connected thereto by air conduit means 46 and 48.

The cooling means 42 and 44 may be of any conventional type and in this particular embodiment of the invention they are two refrigerating units each having interior cooling coils, not shown, for chilling air supplied thereto by ducts 88 and forced thereover by a fan or blower within the unit, not shown.

The air chilled by the refrigerating unit 42 is discharged or impinged onto the tubing 22 in the vicinity of the die 18 by way of vertical conduit means 46 connected at one end to the refrigerating unit 42 and at the other end to a horizontal header 56 located in the cooling chamber 40. Vertically extending downwardly from the header 56 are a pair of flexible ducts 58 which are connected to an annular air ring 60.

The annular air ring 60 encircles the die 18 at its discharge end and projects into the cooling chamber 40 through an opening 62 in the base of housing 38. Such air ring 60 includes an annular plenum chamber 64 into which the chilled air is conveyed from the flexible ducts 58. From the plenum chamber 64 the chilled air flows through a labyrinthine passage 73 to a radial passage 71 formed by rotatable spaced plates 68 and 75 with the inner periphery thereof forming an annular nozzle 70 closely encircling the tubing 22.

The plates 68 and 75 are connected by spacers, not shown, and are rotated in a plane perpendicular to the longitudinal axis of the inflated tubing 22 by an electric motor 72 mounted within the housing 38, the motor drive being through a V-belt 74 to a sheave 76 affixed to the plate 68. The nozzle 70 is proportioned to vent a high velocity precisely shaped annular stream of chilled air. Accordingly, as the nozzle 70 is rotated it issues an annular jet of chilled air which impinges on the tubing 22 closely adjacent the die 18 and then flows upwardly therefrom wholly enveloping and in direct contact with the tubing 22 with the result the solidification point 69 is maintained in close proximity to the die 18 and the tubing 22 is enveloped within a cooling medium to a point substantially beyond its solidification point 69.

The air chilled by the refrigerating unit 44 is discharged into a horizontal header 78 of the conduit means 48 located externally of the housing 38 and connected to the refrigerating unit 44. Vertically extending from the header 78 and into the top of the housing 38 is a pair of discharge ducts 80. Each duct 80 has a nozzle 82 adjacent the squeeze rolls 24 and 26, the nozzles being of substantially the same width as the working surfaces of the squeeze rolls 24 and 26, and being turned inwardly with respect thereto. Accordingly, the chilled air issuing from the nozzles 82 impinges on the breadth of the working surfaces of the squeeze rolls 24 and 26 and flows downwardly therefrom onto the guide slats 30 and tubing 22 to supplement the cooling action on the tubing 22 initiated by the chilled air impinging thereon from the annular air ring 60.

Air discharged from the air ring 60 and the nozzles 82 becomes heated by contact with the hot tubing 22 and such heated air is continuously exhausted from chamber 40 through four exhaust ports 84 located in the top of the housing 38. Two ducts 86 are each connected to a pair of exhaust ports 84 and convey such heated air to a pair of ducts 88 for returning the air to the cooling means 42 and 44. A closed air circuit is thereby formed by the aforementioned connections with the units 42 and 44 taking heated air from the top of the cooling chamber 40 chilling it and then return the chilled air back into the chamber 40. In this manner rapid recirculation of the chilled air is assured.

Figure 4:
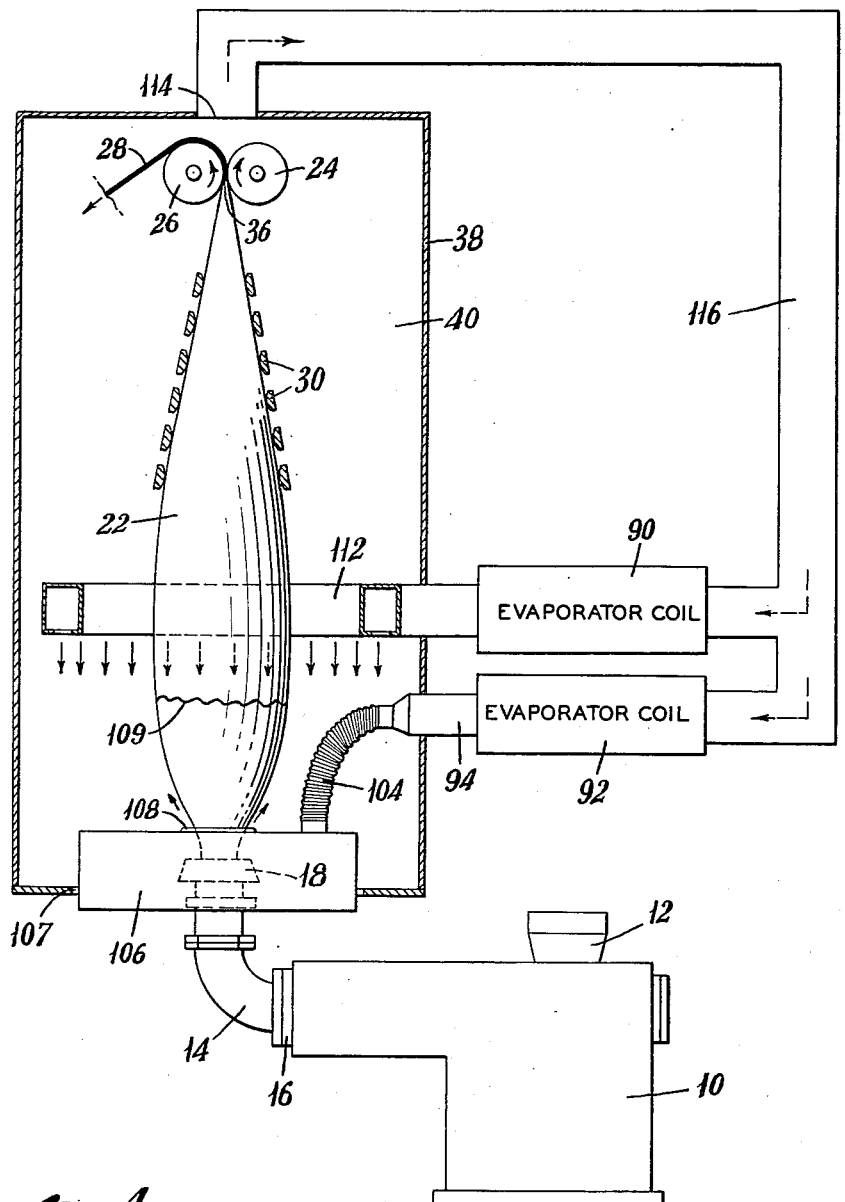
FIG. 4 is a side elevation, partly in section of another form of tubular extruding apparatus.

In the embodiment of the invention shown in FIG. 4 the tubular film extruding apparatus includes air cooling means 90 and 92 located externally of the housing 38 for supplying chilled air to the chamber 40.

The cooling means 90 and 92 may be of any conventional type and in this particular embodiment of the invention they are mechanical refrigerating units having interior cooling coils, not shown, over which air supplied thereto by duct 116 is forced by a fan or blower within the units, not shown.

The air chilled by the refrigerating unit 92 is discharged or impinged onto the tubing 22 in the vicinity of the die 18 by way of conduit means 94 connected at one end to cooling means 92 and at the other end to a flexible duct 104. The opposite end of duct 104 is connected to an air ring 106 which encircles the die 18 at its discharge end and projects into the cooling chamber 40 through an opening 107 in the housing 38.

The air ring 106 includes an air nozzle 108 which is rotated by suitable means, not shown. The nozzle 108 is also proportioned to vent an upwardly flowing high velocity precisely shaped annular stream of chilled air. Accordingly, as the nozzle 108 is rotated, it issues an annular jet of chilled air which impinges on the tubing closely adjacent the die 18 and then flows upwardly therefrom wholly enveloping and in direct contact with the tubing 22 with the result the solidification point 109 is maintained in close proximity to the die 18 and the tubing 22 is enveloped within a cooling medium to a point substantially beyond its solidification point 109.

The air chilled by the refrigerating unit 90 is discharged into a horizontal header 112 encircling and spaced outwardly from the air jet issued from the nozzle 108. Such chilled air being provided to lower the ambient temperature of the chamber as by cooling the housing walls adjacent the extruder 10 and the die 18 may emanate from the header 112 in a number of directions. In the preferred embodiment the header 112 has an opening in bottom surface from which emerges a uniform stream of downwardly flowing chilled air.

The stream of chilled air from the header 112 is directed towards the bottom wall of housing 38 and is drawn upwardly by the inspirating effect of the high velocity air jet vented from nozzle 108. The inspirating effect of the high velocity jet commingles the currents of air which are drawn upwardly toward an exhaust port 114 located immediately above the rolls 24 and 26. In this manner the commingled streams of cool air are drawn to the port 114 and function as a cooling medium for the tubing 22 being flattened, the guide slats 30 and the rolls 24 and 26.

Air discharged from port 114 enters duct 116 whose other end is connected to both refrigerating units 90 and 92. Consequently a closed circuit is formed by the ducts 94 and 112 and 116 connecting the units 90 and 92 with the chamber 40 and exhausting the air from the top of the chamber 40 and chilling it and then returning the chilled air back into the chamber 40. In this manner rapid recirculation of the chilled air is assured.

The details and manner of practicing the invention will be apparent from the following examples, it being understood that the examples are illustrative thereof and that the scope of the invention is not restricted thereto other than as set forth in the appended claims.

*Example I*

Continuous 20″ flat width and 0.00135″ (wall) thickness polyethylene tubing 22 was prepared from polyethylene having a density of 0.92 and a melt index 2.0. The polyethylene was extruded from an extruder of the type shown in FIGS. 1–3 in a formative plastic state at the rate of about 100 lbs. per hour through a die having an annular orifice of .060″ and 6.00″ in diameter (between the outer lip thereof), the temperature of the polyethylene at the lips being approximately 350° F. The extruded tubing 22 was withdrawn upwardly within the cooling chamber 40 of the housing 38 in a vertical direction from the die at the rate of about 80 f.p.m. by the squeeze rolls 24 and 26 positioned about 130″ above the die with the tubing 22 coming into contact with guide slats 30 about 72″ above the die. Sufficient air to inflate the tubing while in the plastic formative state to a final diameter of 12.7″ which, upon flattening, will produce a flat width of 20″ was introduced interiorly of the tubing through the orifice 23. The tubing was withdrawn through the annular air ring 60 which extended into the cooling chamber and was positioned in close proximity to the die so that the chilled air issuing from the air ring impinged on the tubing when it was approximately 1 and ½″ up from the die; and thereafter enveloped the inflated tubing for a distance greater than about 90″ beyond the point of impingement; the amount of impinging air being from about 400 to 600 c.f.m. at a temperature less than 40° F., such as from 33° F. to 40° F. and at a velocity in excess of 5000 f.p.m., such as from 5500 to 7000 f.p.m. The solidification point or "frost line" of the inflated tubing occurred at a distance approximately 10 to 12″ upwards from the die. The working surfaces of the squeeze rolls were maintained at a temperature of less than about 95° F. by impinging chilled air from the nozzles 82 thereupon in the amount of about 700 to 1000 c.f.m. at a temperature less than 40° F. and at a velocity of about 1500 f.p.m. The chilled air directed on the rolls flowed downwardly therefrom onto the guide slats and the tubing to supplement the cooling action initiated on the tubing by the chilled air impinged thereon from the annular air ring. The tubing had a uniform wall thickness and did not stick to the squeeze rolls nor did blocking occur when the tubing was flattened. The heated air from the top of the cooling chamber 40 was continuously returned to the cooling means 42 and 44 by the return ducts 86, 88 with the result that the ambient air temperature in the cooling chamber 40 was about less than 65° F.

*Example II*

Continuous 20″ flat width and 0.00135″ in (wall) thickness polyethylene tubing 22 was prepared from polyethylene having a density of .92 and a melt index 2.0 in the manner set forth in Example I except that the cooling means for the tubing 22, the squeeze rolls 24 and 26, and the guide means 30 were as illustrated in FIG. 3.

The tubing 22 was withdrawn through annular air ring 106 which issued about 400 c.f.m. of chilled air at a temperature of approximately 35° F. and a velocity of 6000 f.p.m. that impinged on the tubing at a velocity of about 4800 f.p.m. near the die 18 and then enveloped the tubing for a distance greater than about 90″ beyond the point of impingement. The tubing was thereafter withdrawn through the distributing header 112 which issued about 700 c.f.m. of downwardly flowing chilled air into the cooling chamber 40 approximately 4′ above the die 18 and adjacent the housing 38 walls at a temperature of approximately 40° F. and at a velocity in excess of about 150 f.p.m. The solidification point or "frost line" of the tubing occurred at approximately 10″ to 12″ above the die. The current of chilled air from the distributing header was inspirated by the air jet from the annular air ring and drawn upwardly toward the exhaust port 114 to envelope the tubing being flattened, the guide slats 30 and the rolls 24 and 26 within a cooling medium. The temperature of the working surface of the rolls 24 and 26 was less than 95° F. and the tubing had a uniform wall thickness and did not block or stick to the squeeze rolls. The upwardly flowing stream of air was continuously conveyed back to the cooling means 90 via the exhaust duct 116 with the result that the ambient air temperature in the cooling chamber 40 was about 65° F. or less.

It is to be noted that the tubing, from the moment it is extruded until it is collapsed and flattened by the squeeze rolls 24 and 26 does not contact or engage any mechanical element except the guide slats 30.

In the foregoing examples, the term "Melt Index" refers to the following test: ASTM Test D–1238–52T; ASTM Standards, 1952, Part 6, page 735. The flow rate is rate of extrusion in grams per 10 minutes (unless otherwise explicitly indicated). Density of the polymers in the examples was measured in grams per cubic centimeter in a gradient column made up of water, methanol, and sodium acetate at 25° C.

The principles of the invention are equally applicable to extrusion in upward, downward or horizontal direction.

Though the invention has been employed in the production of flattened tubing of polyethylene, the invention is not restricted thereto. In general, the invention can be utilized with any melt-extrudable, film-forming thermoplastic material, and mixtures thereof. Each thermoplastic substance or composition possesses certain properties which may make it necessary to determine by experiment the variables in the process which have to be balanced in order to produce tubing of the desired characteristics. This may be especially so with regard to the quantity of gaseous cooling medium since the temperature at the lips of the die may be different with different thermoplastic substances or composition. However, the temperature of the chilled gas can not be so low as to render the thermoplastic brittle, that is, not flexible. For polyethylene of high molecular weights such brittleness temperature as determined by tentative ASTM Test D–746–54T; ASTM Standards, 1954, Supplement to Book of ASTM Standards, Part 6, is in the region $-140°$ C. Hereinafter is set forth a list of illustrative thermoplastic materials which can be used in this invention in addition to polyethylene:

Cellulose acetate ⎫
Cellulose acetate butyrate ⎬ plasticized
Ethyl cellulose ⎭

Methyl methacrylate polymer
Nylon (extrusion of molding grade)
Polystyrene
Polyvinyl formal-acetate butyral
Copolymers of vinyl chloride
Polyvinyl chloride
Copolymers of vinyl chloride and vinylidene chloride.

The properties of the thermoplastic substance or composition can be modified, as by the incorporation therein of suitable modifying agents, such as plasticizers, fillers, coloring agents, heat stabilizers, anti-oxidants, etc.

Since it is obvious that various changes and modifications may be made in the above description without departing from the nature or spirit thereof, this invention is not restricted thereto except as set forth in the appended claims.

What is claimed is:

1. In the blown tube method of preparing self-sustaining plastic film wherein molten thermoplastic is extruded in the form of seamless tubing with the tubing being flattened at a point spaced from the point of extrusion and inflated to a predetermined diameter intermediate the point of extrusion and the point of flattening, the steps which comprise enclosing the tubing from the point of extrusion to and including the point of flattening within a confined area, wholly enveloping the tubing in the vicinity of the point of extrusion within a cooling medium of chilled gas and circulating said chilled gas through the confined area such that said chilled gas wholly envelopes the tubing to and including the point of flattening, to maintain the solidification point of the tubing in close proximity to the point of extrusion.

2. In the blown tube method of preparing self-sustaining plastic film wherein molten thermoplastic is extruded in the form of seamless tubing with the tubing being flattened at a point spaced from the point of extrusion and inflated to a predetermined diameter intermediate the point of extrusion and the point of flattening, the steps which comprise enclosing the tubing from the point of extrusion to and including the point of flattening within a confined area, uniformly impinging an annular stream of chilled gas on said tubing in the vicinity of the point of extrusion and circulating said annular stream of chilled gas through said confined area such that said chilled gas wholly envelopes the tubing to and including the point of flattening, to maintain the solidification point of the tubing in close proximity to the point of extrusion.

3. In the blown tube method of preparing self-sustaining plastic film wherein molten thermoplastic is upwardly extruded in the form of seamless tubing with the tubing being flattened at a point spaced from the point of extrusion and inflated to a predetermined diameter intermediate the point of extrusion and the point of flattening, the steps which comprise enclosing the tubing from the point of extrusion to and including the point of flattening within a confined area, uniformly impinging an annular jet of chilled gas on said tubing in the vicinity of the point of extrusion which thereafter flows upwardly therefrom in direct contact with the tubing and circulating said annular jet of chilled gas through said confined area such that said chilled gas wholly envelopes the tubing to and including the point of flattening, to maintain the solidification point of the tubing in close proximity to the point of extrusion.

4. In the blown tube method of preparing self-sustaining plastic film wherein molten thermoplastic is extruded in the form of seamless tubing with the tubing being flattened by means spaced from the point of extrusion and inflated to a predetermined diameter intermediate the point of extrusion and the point of flattening, the steps which comprise enclosing the flattening means and the tubing from the point of extrusion to said flattening means within a confined area, uniformly impinging an annular stream of chilled gas on said tubing in the vicinity of the extrusion point and circulating said annular stream of chilled gas such that said chilled gas wholly envelopes the tubing to and including the point of flattening, to maintain the solidification point of the tubing in close proximity to the point of extrusion, and impinging a stream of chilled gas on the flattening means to chill the flattening surfaces thereof to prevent the tubing from adhering to said flattening means.

5. In the blown tube method of preparing self-sustaining plastic film wherein molten thermoplastic is extruded in the form of seamless tubing with the tubing being flattened by means spaced from the point of extrusion and inflated to a predetermined diameter intermediate the point of extrusion and the point of flattening, the steps which comprise enclosing the tubing from the point of extrusion to and including the point of flattening within a confined area, uniformly impinging an annular stream of chilled gas on said tubing in the vicinity of the extrusion which thereafter flows upwardly therefrom in direct contact with the tubing, supplying a stream of chilled gas into said confined area between the points of extrusion and flattening of the tubing to lower the ambient temperature of said confined area, and circulating the chilled gas from both streams through said confined area such that said chilled gas wholly envelopes the tubing from the point of extrusion to and including the point of flattening, to maintain the solidification point of the tubing in close proximity to the point of extrusion.

6. In apparatus for preparing self-sustaining plastic film including means to annularly extrude a molten thermoplastic in the form of seamless tubing, means spaced from the point of extrusion to flatten the tubing, and means to inflate the tubing to a predetermined diameter intermediate the extrusion means and the flattening means, the improvement which comprises means for enclosing the flattening means and the tubing from said extrusion means to said flattening means within a confined area, means for annularly impinging a stream of chilled gas in the vicinity of the point of extrusion, and means for circulating said annular stream of chilled gas through said confined area such that said chilled gas wholly envelopes the tubing to and including the point of flattening, to maintain the solidification point of the tubing in close proximity to the point of extrusion.

7. In apparatus for preparing self-sustaining plastic film including means to annularly extrude a molten thermoplastic in the form of seamless tubing, means spaced from the point of extrusion to flatten the tubing, and means to inflate the tubing to a predetermined diameter intermediate the extrusion means and the flattening means, the improvement which comprises means for enclosing the flattening means and the tubing from said extrusion means to said flattening means within a confined area, means for impinging an annular jet of chilled gas on the tubing closely adjacent the point of extrusion which thereafter flows upwardly therefrom, means for impinging chilled gas on the flattening means which thereafter flows onto the tubing to supplement the cooling action thereof initiated by the chilled gas impinged on the tubing, and means for circulating the chilled gas through said confined area such that said chilled gas wholly envelopes the tubing to and including the point of flattening, to maintain the solidification point of the tubing in close proximity to the point of extrusion.

8. In apparatus for preparing self-sustaining plastic film including means to annularly extrude a molten thermoplastic in the form of seamless tubing, means spaced to inflate the tubing to a predetermined diameter intermediate the extrusion means and the flattening means, the improvement which comprises means for enveloping the flattening means and the tubing from said extrusion means to said flattening means within a confined area, means for annularly impinging a stream of chilled gas on the tubing in the vicinity of the point of extrusion, means for supplying a stream of chilled gas to said confined area between said extrusion means and said flattening means to lower the ambient temperature of such area, and means for circulating both streams of chilled gas through said confined area such that said chilled gas wholly envelopes the tubing to and including the point of flattening, to maintain the solidification point of the tubing in close proximity to the point of extrusion.

References Cited in the file of this patent

UNITED STATES PATENTS

| | | |
|---|---|---|
| 2,252,684 | Babcock | Aug. 19, 1941 |
| 2,607,078 | Grimes | Aug. 19, 1952 |
| 2,631,332 | Reber | Mar. 17, 1953 |
| 2,634,459 | Irons | Apr. 14, 1953 |
| 2,753,596 | Bailey | July 10, 1956 |

FOREIGN PATENTS

| | | |
|---|---|---|
| 188,590 | Austria | Jan. 25, 1957 |